United States Patent
Natarajan et al.

(10) Patent No.: US 7,346,507 B1
(45) Date of Patent: Mar. 18, 2008

(54) METHOD AND APPARATUS FOR TRAINING AN AUTOMATED SPEECH RECOGNITION-BASED SYSTEM

(75) Inventors: Premkumar Natarajan, Sudbury, MA (US); Rohit Prasad, Waltham, MA (US)

(73) Assignee: BBN Technologies Corp., Cambridge, MA (US)

( * ) Notice: Subject to any disclaimer, the term of this patent is extended or adjusted under 35 U.S.C. 154(b) by 989 days.

(21) Appl. No.: 10/454,213

(22) Filed: Jun. 4, 2003

Related U.S. Application Data

(60) Provisional application No. 60/386,665, filed on Jun. 5, 2002.

(51) Int. Cl.
*G10L 15/06* (2006.01)
*G10L 15/00* (2006.01)
*G10L 15/14* (2006.01)
*G10L 13/00* (2006.01)
*H04M 1/64* (2006.01)
*H04M 1/54* (2006.01)

(52) U.S. Cl. .............. 704/244; 704/256.2; 704/266; 379/88.04; 379/88.05; 379/88.07

(58) Field of Classification Search ............. 704/207.1, 704/244, 256.2, 266, 270.1; 379/88.04, 88.07, 379/88.08, 88.09, 88.18, 88.05
See application file for complete search history.

(56) References Cited

U.S. PATENT DOCUMENTS

| | | | | |
|---|---|---|---|---|
| 5,027,406 A | * | 6/1991 | Roberts et al. ............. | 704/244 |
| 5,488,652 A | * | 1/1996 | Bielby et al. ............. | 379/88.03 |
| 5,644,680 A | * | 7/1997 | Bielby et al. ............... | 704/240 |
| 5,983,177 A | * | 11/1999 | Wu et al. .................... | 704/244 |
| 5,987,408 A | * | 11/1999 | Gupta ........................ | 704/231 |
| 6,138,097 A | * | 10/2000 | Lockwood et al. ...... | 704/256.2 |
| 6,243,680 B1 | * | 6/2001 | Gupta et al. ................ | 704/260 |
| 6,260,014 B1 | * | 7/2001 | Bahl et al. .................. | 704/254 |
| 2003/0182120 A1 | * | 9/2003 | Hwang ........................ | 704/251 |

OTHER PUBLICATIONS

Natarajan et al, "A Scalable Architecture for Directory Assistance Automation" Proceedings of the IEEE International Conference on Acoustics, Speech and Signal Processing, ICASSP'02, vol. 1, pp. I-21-I24, May 13-17, 2002.*

(Continued)

*Primary Examiner*—Tālivaldis Ivars Šmits
*Assistant Examiner*—Dorothy Sarah Siedler
(74) *Attorney, Agent, or Firm*—Ropes & Gray LLP

(57) ABSTRACT

A method and apparatus for building a training set for an automated speech recognition-based system, which determines the statistically optimal number of frequently requested responses to automate in order to achieve a desired automation rate. The invention may be used to select the appropriate tokens and responses to train the system and to achieve a desired "phrase coverage" for all of the many different ways human beings may phrase a request that calls for one of a plurality of frequently-requested responses. The invention also determines the statistically optimal number of tokens (spoken requests) required to train a speech recognition-based system to achieve the desired phrase coverage and optimal allocation of tokens over the set of responses that are to be automated.

40 Claims, 9 Drawing Sheets

OTHER PUBLICATIONS

Bechet et al, "Dynamic Generation of Proper Name Pronunciations for Directory Assistance" Proceedings of the IEEE International Conference on Acoustics, Speech and Signal Processing, ICASSP'02, vol. 1, pp. I-745-I-748, May 13-17, 2002.*

Asadi et al, "Automatic Modeling for Adding New Words to a Large-Vocabulary Continuous Speech Recognition System" Proceedings of the IEEE International Conference on Acoustics, Speech and Signal Processing, ICASSP'91, col. 1, pp. 305-308, Apr. 13-17, 2002.*

Judith Spitz, "Collection and Analysis of data from real users: implications for speech recogition/understanding systems" Human Language Conference, Proceedings of the workshop on Speech and Natural Language, 1991, pp. 164-169.*

P. Placeway, R. Schwartz, P. Fung, and L. Nguyen, "The Estimation of Powerful Language Models from Small and Large Corpora," *IEEE ICASSP*, Minneapolis, MN, pp. 33-36, Apr. 1993.

L. Nguyen, T. Anastasakos, F. Kubala, C. LaPre, J. Makhoul, R. Schwartz, Y. Yuan, G. Zavaliagkos, Y. Zhao, "The 1994 BBN/BYBLOS Speech Recognition Systems," *DARPA Spoken Language Systems Technology Workshop*, Austin, TX, Jan. 1995, pp. 77-81.

L. Nguyen and R. Schwartz, "Efficient 2-pass N-best Decoder," *Eurospeech*, Rhodes, Greece, vol. 1, pp. 167-170, Sep. 1997.

D. Miller, T. Leek and R. Schwartz, "A Hidden Markov Model information retrieval system," *ACM SIGIR*, Berkeley, CA, pp. 214-221, Aug. 1999.

C. Popovici, M. Andorno, P. Laface, L. Fissore, M. Nigra, C. Vair, "Learning of User Formulations for Business Listings in Automatic Directory Assistance," *Eurospeech*, Aalborg, Denmark, Sep. 2001.

* cited by examiner

FIG 1: PERCENTAGE OF TRAFFIC COVERAGE vs. SIZE OF FRN SET

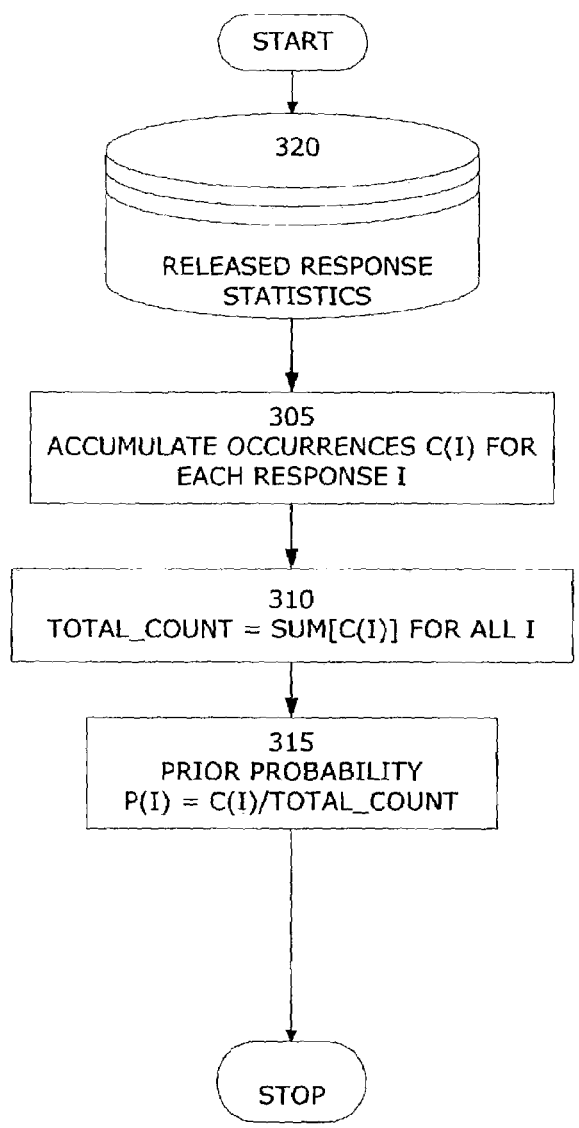
FIG. 3: PROBABILITY OF OCCURRENCE

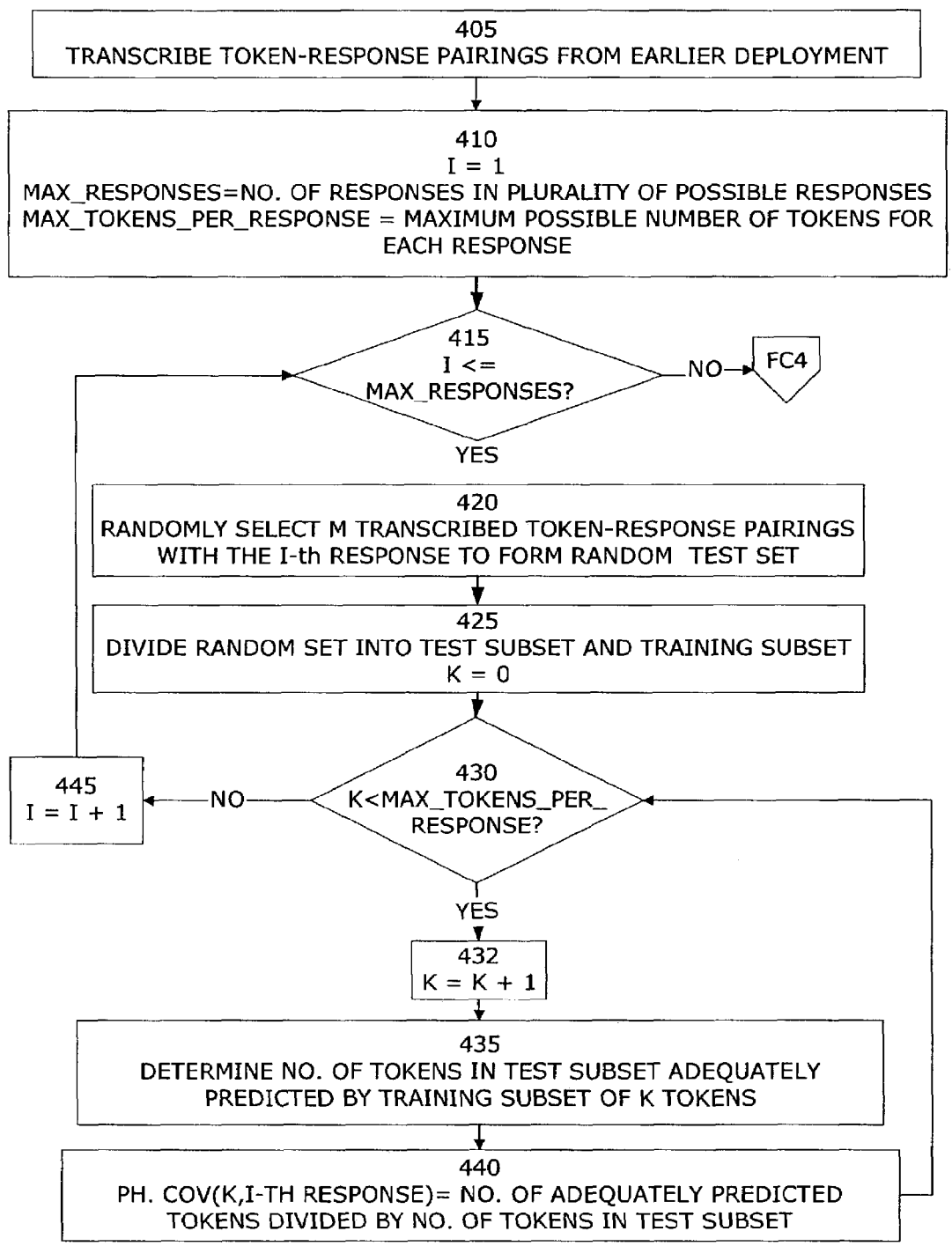

FIG. 4B: EXPECTED PHRASE COVERAGE
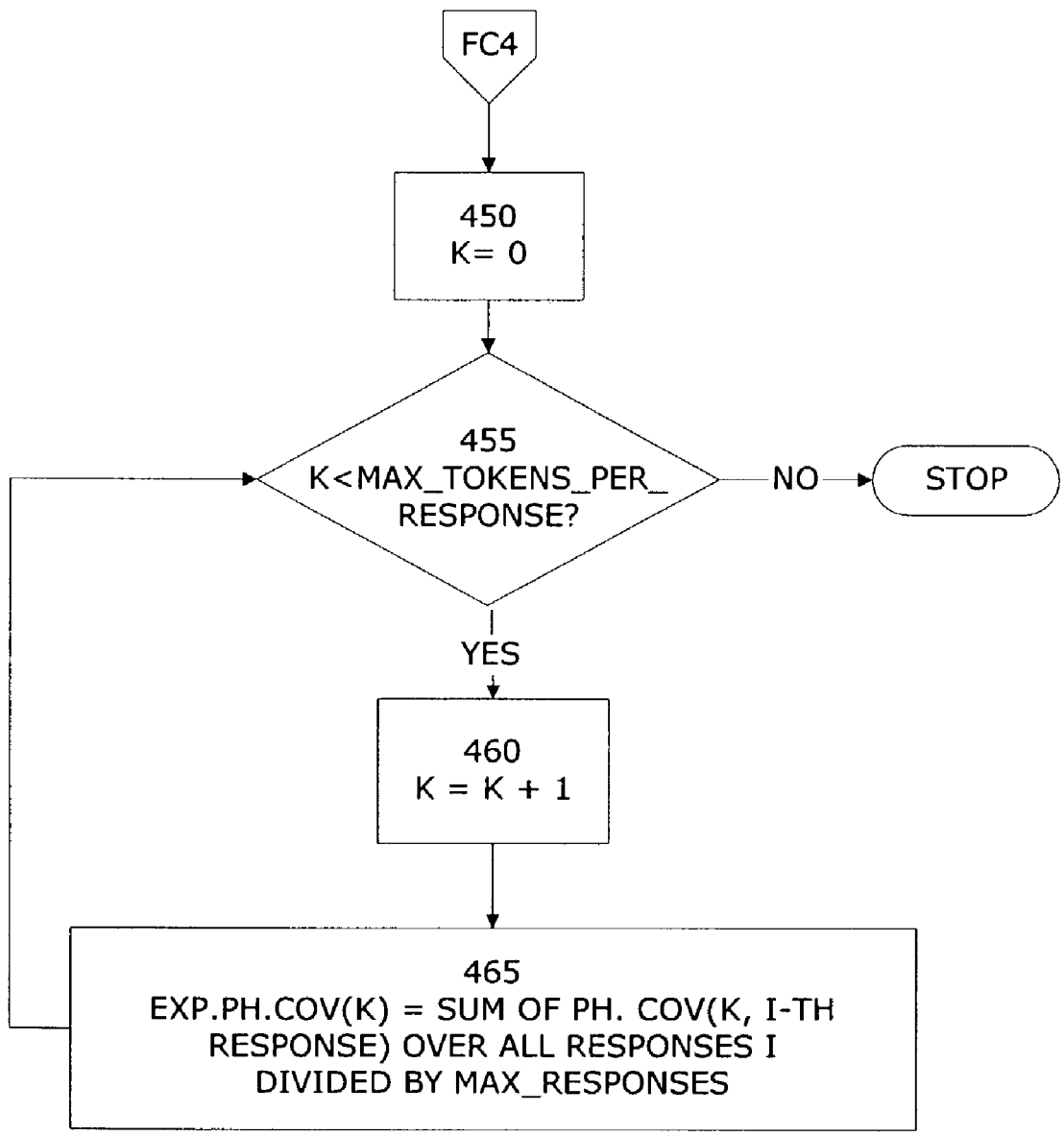

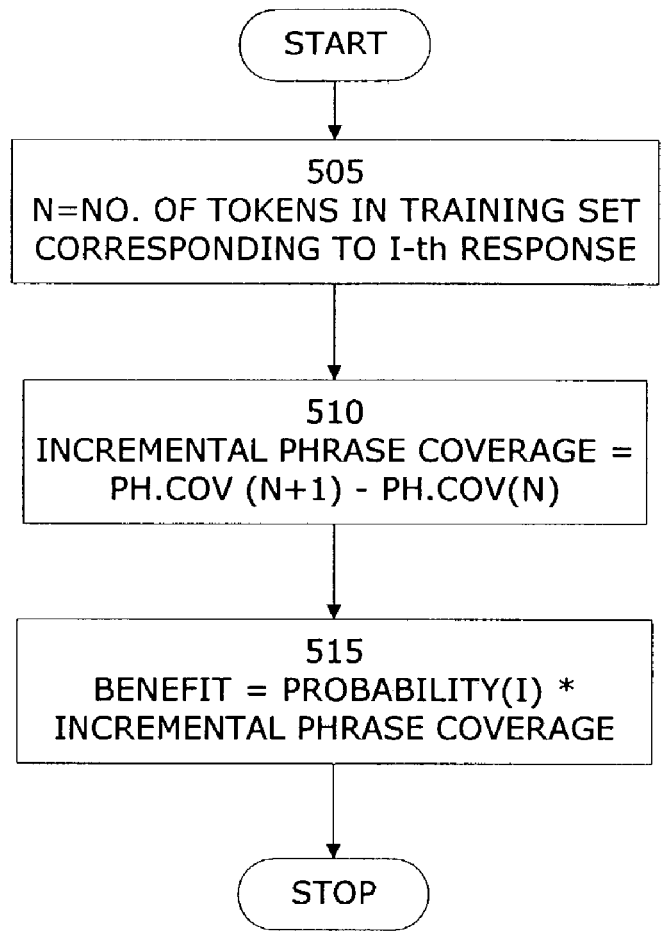
FIG. 5: BENEFIT CALCULATION

METHOD AND APPARATUS FOR TRAINING AN AUTOMATED SPEECH RECOGNITION-BASED SYSTEM

RELATED APPLICATIONS

This application claims priority under 35 U.S.C. § 119 to provisional application No. 60/386,665, filed Jun. 5, 2002, the entirety of which is incorporated herein by reference.

BACKGROUND OF THE INVENTION

1. Field of Art

The present invention relates generally to speech recognition-based systems, such as automated directory assistance systems, and, more specifically, to methods and apparatuses for training speech-recognition-based systems.

2. Related Art

Directory assistance services typically require a large number of human operators manning telephones in numerous call centers that are spread out across the country. Sometimes these call centers have to operate twenty-four hours a day, seven days a week and 365 days a year. Because it takes so much manpower and so many resources to provide these services, directory assistance service companies realize that substantial savings can be achieved by replacing human operators and call centers with speech recognition-enabled Directory Assistance Automation (DAA) systems. When they are properly trained, configured and deployed, DAA systems use speech-recognition technology to automatically receive, recognize and respond to some portion of the directory assistance call traffic without human intervention, thereby saving directory assistance providers substantial time, effort and money, and allowing the providers to apply those resources to call traffic that cannot be automated.

Directory assistance requests for business telephone numbers typically account for as much as 80% of all directory assistance calls, the remaining 20% involving requests for residential listings. Moreover, it has been observed by those in the industry that only a small fraction of all business listings contained in a given business listing database account for most of the directory assistance call traffic. In other words, out of all the hundreds of thousands of businesses in this country that would be included in any business-listing database, it is only a relatively small number of well-known companies in that database (e.g., Walmart, Sears and American Airlines) that account for the overwhelming majority of directory assistance calls. This small set of frequently requested business telephone numbers is often referred to as the set of frequently requested numbers (FRNs). Because requests for FRNs represent such a large share of all directory assistance calls, directory assistance service providers typically try to automate some portion of the FRN call traffic first.

In the last decade, there have been many tremendous advances in speech recognition technology, both in terms of its functionality and performance. Nevertheless, many significant problems still exist when it comes to using conventional speech recognition technology in certain commercial applications. DAA is a prime example of a commercial application where these problems arise and, heretofore, have not been adequately addressed by the conventional systems and methods.

A typical directory assistance request in the United States requires some kind of human intervention. Usually, the call is initiated when a caller seeking a telephone number for a particular listing dials 411. When the connection is established, the caller is usually asked to speak the names of a city and state for the listing (also called the locality). The caller's response is usually recorded and stored in a computerized system. Next, the caller will be prompted to state the name of the business or person the caller wishes to reach, usually with the phrase, "What Listing?" or some variant of the same. Again, a computer system records and stores the caller's response. Typically, the caller's two responses (or utterances) are then forwarded to an operator who searches a telephone number database for the relevant telephone number. The database search usually involves a fast, pattern-matching algorithm that returns a relatively small list of telephone numbers deemed by the system to be the most likely candidates for the requested listing. The operator must quickly scan this list and select a unique telephone number to release to caller, or, if necessary, ask the caller for additional disambiguating information, such as a street name or address for the listing.

There are at least two significant problems with the typical system described above. First, it still involves using a human operator to scan a list of likely candidates and select the correct telephone number to release to the caller. Second, and more importantly, directory assistance callers rarely ask for a listing by saying it exactly as it appears in the telephone directory. Instead, callers frequently leave out parts of a listing (e.g., by saying "Sears" instead of "Sears, Roebuck and Company Department Store"). They insert extra words (e.g., "K-Mart Department Store on Main Street" instead of "K-Mart"). They insert extraneous words (e.g., "Uh, I want the number for Sears, please"). They abbreviate listings (e.g., "DMV" for "Department of Motor Vehicles"). They also use other names entirely (e.g., "The phone company" instead of "Verizon"). Often, callers are even speaking to other people while the DAA system is recording the caller's response to the prompts (e.g., "Hey, hold on a second, I'm on the phone . . . give me the number for Verizon, please.").

Since it is extremely difficult to predict exactly what a caller will say when prompted for a listing, directory assistance providers typically supply the DAA system with some kind of finite-state grammar (FSG), comprising the most frequently occurring user requests (and their associated FRNs) from a random sample of real-world directory assistance calls. The grammars are created by recording callers' utterances (also known as training tokens) and storing them in a database along with the correct responses as determined by the human operators who took the calls. Then the DAA system is trained against the grammar of tokens and correct responses until the DAA system can do a reasonably good job of recognizing and responding to some specified target percentage of caller utterances that are likely to be received.

With conventional systems, practical difficulties still arise, however, when providers try to determine the amount and nature of training data that should be included in the grammar to achieve a target automation rate (i.e., the percentage of correct verses incorrect automated responses). The graph in FIG. 1 illustrates the rate at which the FRN set size grows with the call traffic coverage that is desired. The size of the FSG that must be used to train the system grows in proportion to the growth of the FRN set. As shown in FIG. 1, the increases in traffic coverage begins to level out significantly after a certain number of FRNs are added to the FSG. The fact that continuing to increase the size of the FSG begins to have less and less impact on the traffic coverage achieved presents a computational problem for higher automation levels (unless one designs an annoyingly deep hierarchical call flow that asks a series of disambiguating questions). The problem is compounded by the fact that, as stated above, there are so many ways in which different callers will ask for the same listing. Measurements on actual customer calls show that only 40% of the users ask for a given listing in one particular way. Even if one allows for 10 different ways of asking for each listing, the resulting grammar only covers about 66% of the queries. Thus, it can be extremely difficult for the directory assistance provider to determine the optimal number of FRNs to automate, the optimal number of training tokens needed to train the system to handle the FRNs to be automated, and the optimal allocation of the training tokens across all of the automated FRNs in order meet a specified target automation rate.

In addition, callers are often unsure about the physical location of a particular business and, therefore, an exact combination of the recognized locality and listing is often not present in the system. As a result, the requested FRN cannot be obtained from the DAA database, which means the call cannot be automated. For these reasons, the FSG approach described above does not scale well to higher automation rates.

Accordingly, a need exists for more efficient methods of estimating the nature and amount of training data required to achieve a target automation rate. In particular, the industry needs more robust and dependable ways to determine the optimal number of responses (such as FRNs) to automate, the optimal number of training tokens required to train the system, and the optimal allocation of those training tokens across the set of responses to be automated. Such a system would be even more useful if it were adapted to operate efficiently even though the training tokens do not exactly match the callers' spoken words.

SUMMARY OF INVENTION

The present invention addresses these needs by providing a method for building a training set of token-response pairings for an automated speech-recognition-based system. The method comprises the steps of: (a) for each response in a plurality of possible responses, calculating a benefit that would be achieved by adding to the training set a token-response pairing for said each response, based on an expected phrase coverage for said each response and a probability of occurrence for said each response; (b) identifying a maximum benefit response, said maximum benefit response being equal to the response from the plurality of possible responses having the maximum benefit; (c) adding to the training set, a token-response pairing containing the maximum benefit response; (d) incrementing a current phrase coverage for the training set by an amount equal to the product of the expected phrase coverage for the number of token-response pairings in the training set that contain the maximum benefit response, and the probability of occurrence of the maximum benefit response; and (e) repeating steps (a) to (d) until the current phrase coverage is greater than or equal to a specified target phrase coverage. In a preferred embodiment, the token-response pairing containing the maximum benefit response is selected from a supply set of randomly-selected token-response pairings.

A token-response pairing is a pairing of a token with its correct response. In practice, token-response pairings are provided by recording and transcribing a predetermined number of tokens along with their correct responses, and storing the transcribed tokens in a database that is indexed according to the correct responses. Thus, every token in the database can be matched with a correct response for that token. Notably, any single correct response in the database could have, and probably will have, many tokens associated with it.

The probability of occurrence for each response in the plurality of possible responses is determined by (a) providing a collection of responses supplied in response to a predetermined number of user requests; and (b) for each response in the plurality of possible responses, counting the number of times said each response occurs in the collection to generate a frequency of occurrence for said each response, and dividing the frequency of occurrence by the predetermined number of user requests.

The expected phrase coverage for each response is determined by (a) providing a collection of token-response pairings supplied in response to a predetermined number of user requests; and (b) for each response in the plurality of possible responses, randomly selecting from the collection a predetermined number of token-response pairings containing said each response to form a random set of token-response pairings, dividing the random set into a training subset and a test subset, determining a number of tokens in the test subset that are "adequately predicted" by the training subset, and dividing the number of adequately predicted tokens by a number of tokens in the test subset. In some embodiments, the number of tokens "adequately predicted" equals the number of phrases in the training subset that exactly match a phrase in the test subset. In other embodiments, the number of tokens "adequately predicted" equals the number of phrases in the training subset that match a phrase in the test subset, based on a perplexity threshold of a statistical n-gram language model, which does not require an exact match. The n-gram language model may or may not be trained against another training set of token-response pairings. Moreover, the statistical n-gram language model may be measured against a test set of token-response pairings.

In a preferred embodiment, the benefit is calculated by first computing an incremental phrase coverage that would be achieved by adding a token-response pairing to the training set, and multiplying the incremental phrase coverage by the probability of occurrence of each response in the plurality of possible responses. The incremental phrase coverage comprises, in some embodiments the difference between the expected phrase coverage for each response if the training set held one additional token corresponding to the response and the current phrase coverage for the response.

The token-response allocation method described herein may be extended to incorporate other information known about the frequently requested responses based on prior deployments. Such known information may include, for example, the retrieval efficiency for each response. Retrieval efficiency is the fraction of correctly recognized responses that end up being automated, such as by a lookup table or any other retrieval mechanism. Since the retrieval efficiency for different responses varies, the method described above may be improved by incorporating the retrieval efficiency into the benefit calculation. Thus, the step of calculating the benefit may include multiplying the product of the incremental phrase coverage and the probability of occurrence for each response by a retrieval efficiency value for each response.

When the responses being added to the training set are FRNs, it is usually the case that certain types of FRNs are easier to automate than others. For example, FRNs for department store listings tend to have many different numbers associated with the listing. Such FRNs are referred to as a "caption set" of FRNs (one number for each FRN). On the other hand, some FRNs have a single number associated with them and are referred to as "straight-line" listings. Straight-line listings are easier to automate than caption sets. This known information may be included in the benefit calculations in the form of a "probabilistic cost" for the FRN. Thus, the step of calculating the benefit may also include multiplying the product of the incremental phrase coverage and the probability of occurrence for each response by the probabilistic cost for each response in the plurality of possible responses.

Each token in the training set may comprise a transcribed directory assistance request and each response in the training set may comprise a transcribed response to a directory assistance request. However, the invention may be readily extended to automated provisioning of other kinds of information, such as driving directions, movie listings, product use instructions, etc., as well as other kinds of applications, such as automated call routing.

In another aspect of the invention, there is also provided a computer system for building a training set of token-response pairings for an automated speech-recognition-based system. The computer system comprises means for calculating a benefit that would be achieved by adding to the training set a token-response pairing for each response in a plurality of possible responses, means for identifying the response with the maximum benefit, means for adding the token-response pairing containing the maximum benefit response to the training set, and means for incrementing the current phrase coverage to account for the incremental phrase coverage achieved by adding the token-response pairing. The current phrase coverage is incremented in an amount equal to the product of the expected phrase coverage for the number of token-response pairings in the training set that contain the maximum benefit response, and the probability of occurrence of the maximum benefit response. In the preferred embodiment, the maximum benefit response may be selected from a supply set of randomly-selected token-response pairings.

In this aspect, the calculating means is configured to respond to a means for computing the probability of occurrence for said each response and a means for computing the expected phrase coverage for said each response. The means for computing the probability of occurrence for said each response comprises a collection of responses supplied in response to a predetermined number of user requests, means for generating a frequency of occurrence for each response in the collection, and means for dividing the frequency of occurrence for each response by the predetermined number of user requests.

The means for computing the expected phrase coverage for each response comprises a collection of token-response pairings supplied in response to a predetermined number of user requests, means for randomly selecting from the collection a predetermined number of token-response pairings containing each response to form a random set of token-response pairings, means for dividing the random set into a training subset and a test subset, means for determining the number of tokens in the test subset that are adequately predicted by the training subset, and means for dividing the number of adequately predicted tokens by a number of tokens in the test subset. The number of tokens adequately predicted may be calculated using the number of phrases in the training subset that exactly match a phrase in the test subset, or the number of phrases in the training subset that match a phrase in the test subset based on a perplexity threshold of a statistical n-gram language model.

The means for calculating the benefit comprises means for computing an incremental phrase coverage (which equals the difference between the current phrase coverage for said each response and the expected phrase coverage for each response if the training set held one additional token corresponding to that response), and means for multiplying the incremental phrase coverage by the probability of occurrence of each response in the plurality of possible responses.

Preferably, the above-described computer system also includes means for including the retrieval efficiency and probabilistic cost in the benefit analysis. In practice, this means may comprise one or more programs or processes configured to multiply the product of the incremental phrase coverage and the probability of occurrence for each response by the retrieval efficiency and probabilistic cost for each response in the plurality of possible responses.

A computer system for generating a training set of token-response pairings for an automated speech-recognition-based system consistent with the present invention comprises a phrase coverage processor module configured to calculate a phrase coverage associated with one response out of a plurality of possible responses, a probability of occurrence module configured to compute, responsive to a prior collection of token-response pairings, a statistical probability that the response will occur in a predetermined number of responses, a benefit processor configured to determine a benefit that would be achieved by adding a token-response pairing to the training set and a maximum benefit response, responsive to the phrase coverage processor module and the probability of occurrence module, and a training set generation module configured to add to the training set a token response pairing from the supply set containing the maximum benefit response. In a preferred embodiment, the training set generation module selects the token-response pairing containing the maximum benefit from a supply set of randomly-selected token-response pairings.

The present invention may be advantageously combined with various computer system architectures for providing and training automated directory assistance systems. One such architecture is described in a co-pending application entitled, "SYSTEMS AND METHODS FOR PROVIDING AUTOMATED DIRECTORY ASSISTANCE" (application Ser. No. 09/656,264, filed on Sep. 6, 2000), which is assigned to the assignee of the present application and is incorporated herein in its entirety by this reference.

It is also possible to use the methods and systems described above for purposes other than directory assistance automation, such as collecting training data for natural language call routing systems. In this case, the training data is collected for different call routing destinations (also called topics) rather than FRNs. The underlying problem is the same, however. Namely, given that the goal is to collect only a fixed number of caller utterances (or tokens), how should the tokens be distributed by topic. Again, by using the probabilistic approach summarized above and described in detail below, it is possible to determine an optimal distribution for the tokens over the set of topics.

Thus, the systems and methods summarized above also may be used to improve the efficiency of various methods of training natural language call routing systems. One such method is described in a co-pending application entitled "UNSUPERVISED TRAINING IN NATURAL LANGUAGE CALL ROUTING," (application Ser. No. 10/279,336, filed Oct. 24, 2002), which is also assigned to the assignee of the present application and incorporated herein in its entirety by this reference.

The present invention provides a more efficient and effective technique for identifying and collecting training data for a large variety of general and specialized grammar and speech models that may be utilized, for example, to build and implement a wide range of speech recognition-based products or services, such as the directory assistance system described in co-pending application Ser. No. 09/656,264 or the natural language call routing training method described in co-pending application Ser. No. 10/279,336. Such specialized grammar models including, for instance, acoustic models, language models, statistical listing models, information retrieval models, confidence measure models, rejection models and speech grammar estimation models, are shown in FIG. 8 and discussed below with reference thereto.

FEATURES AND ADVANTAGES OF THE INVENTION

It is a feature of the present invention that it determines the statistically optimal number of frequently requested responses to spoken queries (e.g., directory assistance requests, requests for instructions, requests to hear information on a certain topic, requests for account information, requests to speak to a certain party or a certain type of expert, etc.) to automate in order to achieve a desired automation rate, that is, to achieve a certain "phrase coverage" for all of the many ways human beings may phrase requests for a certain number of frequently-requested responses.

It is another feature of the present invention that it determines the statistically optimal number of tokens (spoken requests) required to train a speech recognition-based system to achieve the desired phrase coverage.

It is yet another feature of the present invention that it determines an optimal allocation of tokens over the set of responses that are to be automated. In other words, once it is determined how many frequently requested response are to be automated, and it is decided how many tokens are needed, one still needs to determine how many tokens to collect for the most frequently requested response, the second most frequently requested response, the third most frequently requested response, and so on. The present invention provides the statistically optimal solution to this problem.

It is both a feature and a significant advantage of the present invention that it provides all three of these solutions (the optimal number of frequently requested responses to automate, the optimal number of tokens to collect to train the automated system and the optimal allocation of tokens over the frequently requested responses) all at the same time. In other words, when the present invention is operated so that it selects token-response pairing for the training set until the desired phrase coverage is reached, the number of responses in the training set of token-response pairings, by definition, equals the statistically optimal number of responses to automate to achieve the desired phrase coverage. Moreover, when the training set of token-response pairings is complete, the distribution of tokens to matching responses in the training set comprises the statistically optimal allocation of tokens over all of the responses to achieve the desired phrase coverage.

It is a further advantage of the present invention that it reduces the cost of providing any speech recognition-based system by maximizing the efficiency and effectiveness of collecting training data.

Additional features and advantages of the present invention are set forth in part in the description that follows, and in part are apparent from the description, or may be learned by practice of the invention. The embodiments, features and advantages of the invention may also be realized and attained by means of the instrumentalities and combinations particularly set out in the appended claims.

BRIEF DESCRIPTION OF THE FIGURES

The foregoing summary, as well as the following detailed description, will be best understood in conjunction with the attached drawings, which are incorporated in and constitute part of the specification. The drawings illustrate preferred embodiments of the invention, and, together with the description, serve to explain the principles of the present invention.

FIGS. 2, 3, 4A, 4B and 5 depict high-level flow diagrams illustrating examples of algorithms that might be performed by a DAA configured to operate according to embodiments of the present invention.

DETAILED DESCRIPTION OF THE PREFERRED EMBODIMENTS

Figure 1:
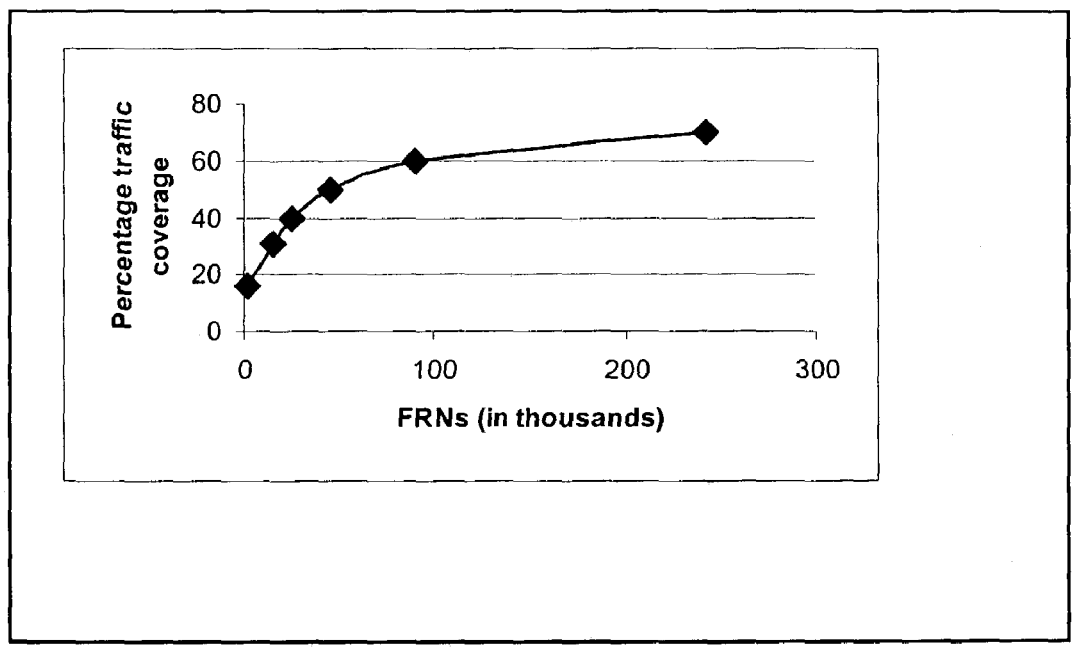
FIG. 1 contains a chart illustrating the rate at which the FRN set size for a speech recognition-based system grows with call traffic coverage.

Reference will now be made in detail to preferred embodiments of the invention, examples of which are illustrated in some of the drawings. Notably, the present invention may be implemented using software, hardware, or any combination thereof, as would be apparent to those of ordinary skill in the art. Therefore, the figures and examples below are not meant to limit the scope of the present invention or its embodiments or equivalents.

It should be understood, for example, that although the following description refers extensively to directory assistance automation systems, directory assistance automation is just one example of the many commercial and non-commercial applications for which the present invention may be advantageously employed. There are many other speech recognition-based applications, such as automated call routing, for example, which can benefit from applying the speech recognition model training techniques and principles embodied in the invention and as described below.

For the following detailed discussion of illustrative embodiments of the present invention, it is helpful to first explain a few terms that will be used in the discussion. For example, a caller is a person who calls into a directory assistance system and requests the telephone number for a listing in a directory assistance database. A token is an audio recording of the caller's request (usually in response to a prompt provided by the directory assistance system), along with a text transcription of the audio recording. A response is typically, although not necessarily, a symbolic representation of the desired output of the directory assistance system when it correctly responds to the caller's request (or token).

The typical way of training an automatic speech recognition-based system to provide directory assistance without a human operator is to collect a training set of token-response pairings for a certain pre-determined set of possible responses. The pre-determined set of possible responses could include all possible responses or some subset of all possible responses, such as, for example, the 10, 100 or 1000 most frequently requested responses. In addition to the training set, a test set of token-response pairings for the same pre-determined set of possible responses is also collected.

The prior probability p(t) of a frequently requested number (FRN) is the probability that, out of all the possible FRNs, a particular FRN will be requested. The prior probability is usually, although not necessarily, based on the long-term directory assistance statistics associated with a non-automated or partially-automated directory assistance deployment that took place at a previous time t. Thus, the prior probability of the I-th FRN occurring in the current deployment, based on call statistics obtained from the prior deployment, equals $p(t_i)$.

Phrase coverage is defined as the fraction of the number of tokens in the test set that are "adequately predicted" by the tokens in the training set. One may say, for example, that if the training set contains five tokens that "match" five out of the ten tokens in the test set that correspond to a certain response, then five of the ten tokens for that response are "adequately predicted," and the phrase coverage for the training set, for that response at least, is therefore fifty percent.

Figure 8:
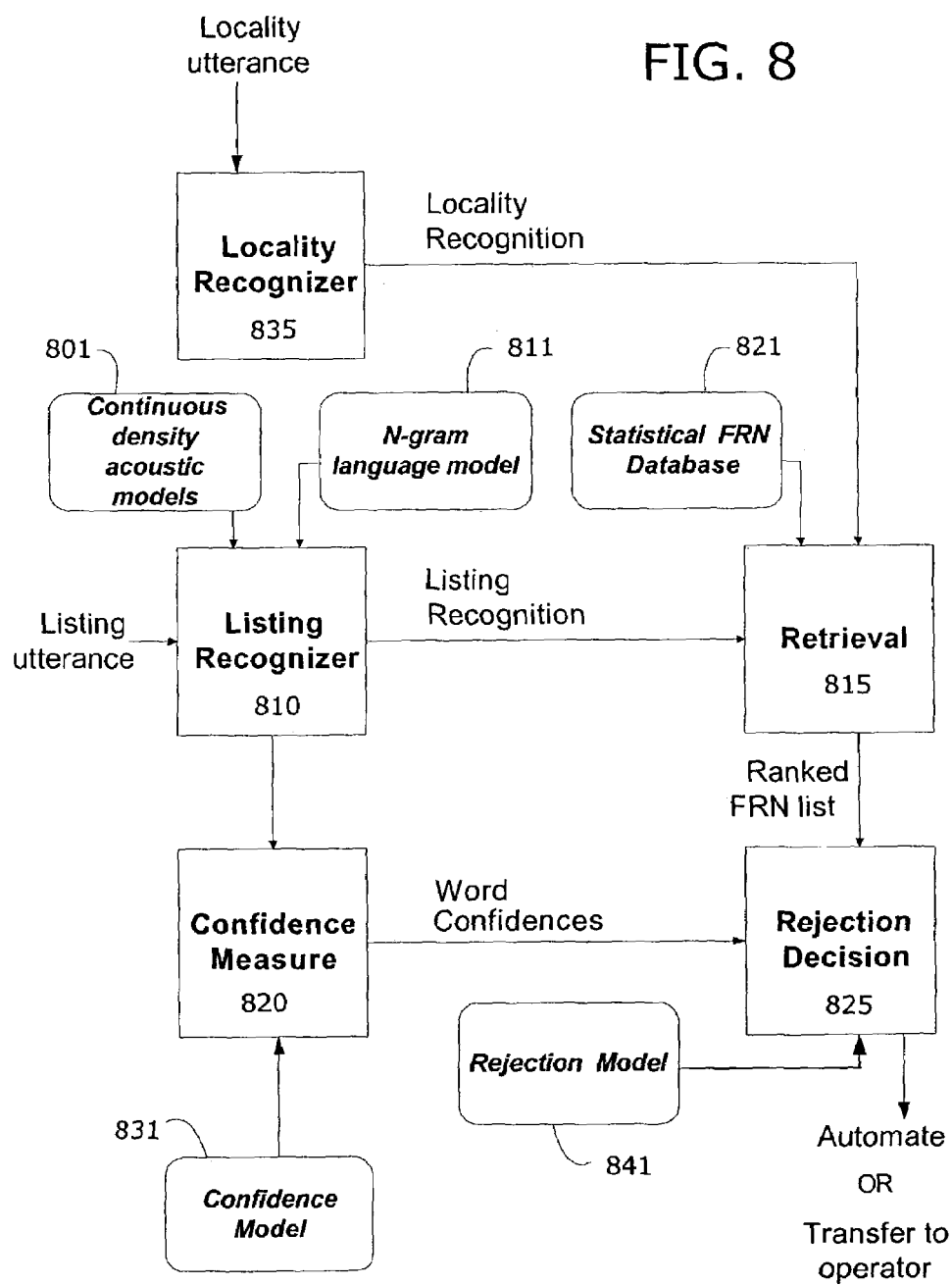
FIG. 8 shows a block diagram that graphically illustrates a system architecture that may be configured to operate in accordance with the present invention.

Whether a token in the training set "matches" a token in the test set depends on how the system is configured to detect a "match." In some embodiments, a match will be found when a token in the training set is an exact match for a token in the test set. In a preferred embodiment, however, inexact matches between the test data token and the training data token are allowed. By using statistical n-gram grammars for matching purposes, it is possible to robustly model a huge set of possible caller requests (tokens). Unlike phrase-based grammars that work only when the caller utters one of a pre-defined set of sentences (i.e., the grammar), statistical n-gram grammars allow the recognition of caller utterances where the caller uses his or her own natural style to describe the listing for which the caller wishes to obtain a telephone number. This is achieved by assigning a continuous statistical score to every hypothesized sequence of words. N-gram models are well-known and are described, for example, in F. Jelinek, R. L. Mercer and S. Roukos, "Principles of Lexical Language Modeling for Speech Recognition", in Readings in Speech Recognition, edited by A. Waibel and Kai-Fu Lee, pages 651-699, Morgan Kaufmann Publishers, 1990, H. Witten and T. C. Bell. "The Zero Frequency Estimation Of Probabilities of Novel Events in Adaptive Text Compression", IEEE Transactions on Information theory, volume 7, number 4, pages 1085-1094, 1991, and P. Placeway, R. Schwartz, P. Fung and L. Nguyen, "Estimation of Powerful LM from Small and Large Corpora", Proceedings of the International Conference on Acoustics, Speech and Signal Processing, Volume 2, pages 33-36, 1993, all of which are incorporated in their entirety by this reference. On the other hand, phrase-based grammars are far more discrete or bi-modal: they assign a high score to an utterance that conforms with the pre-defined grammar and a very low score to a non-conforming utterance. A method of retrieving a correct FRN from a database given a recognized token (listing request) using a tri-gram language model, which is a special case of an n-gram language model, is described below with respect to FIG. 8. FIG. 8 graphically depicts the flow of operations in an exemplary directory assistance automation architecture configured to operate in accordance with the present invention.

As stated above, the phrase coverage for the I-th FRN is a function of training tokens $k_i$. In the discussion that follows, the phrase coverage for the I-th FRN will be written as $ph.cov(k_i)$.

As illustrated by the decreasing slope of the curve plotted on the graph shown in FIG. 1, it has been observed that the marginal benefit (in terms of the incremental phrase coverage achieved) resulting from adding another FRN to the set of FRNs already automated decreases precipitously as the number of automated FRNs increases. In other words, a much larger increase in phrase coverage is achieved as the number of FRNs automated goes from 0 to 5,000 than when the number of FRNs automated goes from 5,001 to 10,000. Thus, in a real-world situation where there is a directory assistance database containing 1,000,000 telephone numbers, for example, it may only make sense, from a cost-verses-benefit perspective, to automate the top 25,000 FRNs. For this reason, it is extremely important, from a business case perspective, to have some way of selecting the absolute optimal number of FRNs to automate to achieve a desired phrase coverage.

The next question that must be answered, from a business case perspective, is how many training tokens are required to achieve the desired phrase coverage. The number training tokens needed increases, sometimes dramatically, with the number of FRNs that need to be automated.

The final question is how should the selected training tokens be allocated over all of the FRNs automated. In other words, one must figure out how many training tokens should be collected for the first most frequently-requested telephone number, how many training tokens should be collected for the second most frequently requested telephone number, how many training tokens should be collected for the third most frequently telephone number, and so on, in order to achieve the maximum phrase coverage for the minimum amount of training tokens.

In very basic terms, the present invention addresses these problems by applying statistical probability analysis repeatedly to answer the question: "given the opportunity to add one more token-response pairing to the training set, which token-response pairing should be added?" Since the ultimate aim to is obtain a target phrase coverage with a minimum number of training tokens, the answer is a token-response pairing, corresponding to a response for which the product of the prior probability and the expected phrase coverage is greatest, is the one that should be added. This solution may be represented by the equation:

$$p(t_i)*ph.cov(k_i)$$

where $p(t_i)$ is the prior probability of the I-th response occurring and $ph.cov(k_i)$ is the expected phrase coverage for the I-th response given $k_i$ training tokens.

A fortunate side-effect of this procedure is that it automatically provides an optimal estimate of the total number of training tokens needed to achieve the target phrase coverage. At any point during the performance of the token allocation procedure of the present invention, the total phrase coverage (as a percentage) is represented by the equation:

$$100*\Sigma_i p(t_i)*ph.cov(k_i)$$

According to the principles of the present invention, an optimal selection and allocation of token and FRN pairings for a training set for a speech recognition-based system may be achieved as illustrated in the following algorithm:

Token and FRN Pair Selection Algorithm,
```
while (Current Ph.Cov<Target Ph.Cov)
{
  for (i=1; i<Number of Telnos; i++)
  {
    Benefit[i]= P[i] * (Expected Ph.Cov[Ntokens[i]+1]–
      Expected Ph.Cov[Ntokens[i]]);
    if (Benefit[i]>Max_Benefit)
    {
      Max_Benefit=Benefit[i];
      BestFRNForTraining=i;
    }
  }
  Current Ph.Cov=Current Ph.Cov + Max_Benefit;
  Ntokens[i]++;
  TotalTokens++;
}
```

In the algorithm above, i represents I-th FRN in a predetermined set of FRNs. The current phrase coverage for the training set will initially be set to zero. The algorithm should be supplied with four inputs: the current phrase coverage (initially set to zero); the target phrase coverage (e.g., 40%); access to a set of released telephone number statistics from a prior non-automated or partially-automated deployment (in order to compute the prior probability of occurrence p(i)); and an expected phrase coverage distribution, which can be calculated as described in detail below. TotalTokens is the total number of tokens that should be added to the training set. Ntokens is an array that tracks the number of tokens in the training set for each FRN. When the algorithm is complete, the variable BestFRNForTraining will contain the FRN that has the maximum benefit. The final step (not shown in the algorithm above) is to add to the training set a token-FRN pair containing an FRN equal to the value of the variable BestFRNForTraining.

Figure 2:
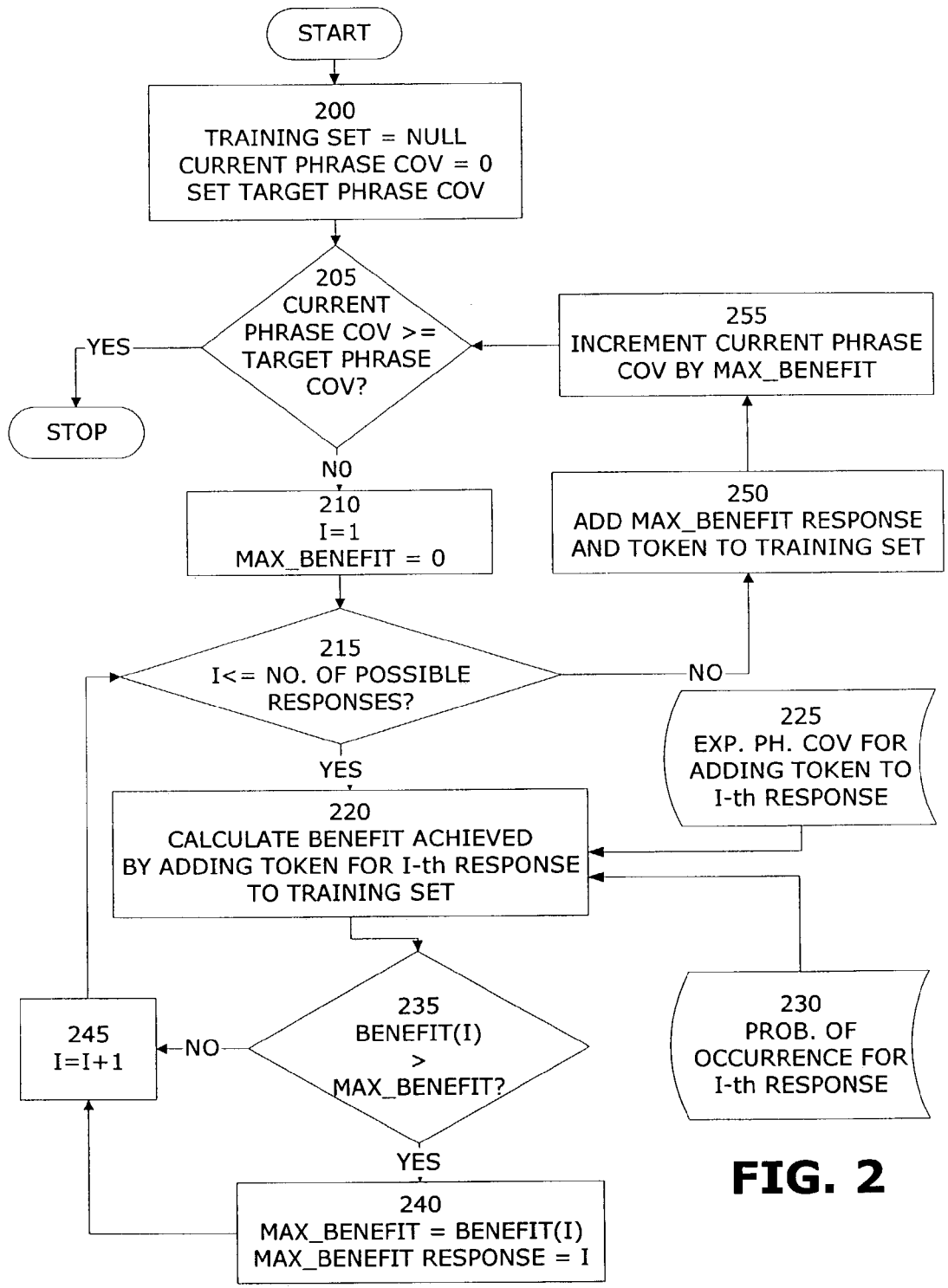

FIG. 2 illustrates an example of the steps that might be performed by a processor configured to implement an embodiment of the algorithm shown above. As shown by in FIG. 2 at step 200, the training set is set to NULL, the current phrase coverage is set to zero and a target phrase coverage is specified, usually according to a business case based on historical call traffic statistics. A company might decide for example, that the business case is made (in terms of time, effort, money and manpower, to name just a few of the relevant variables) if forty percent (40%) of the call traffic is automated. Therefore, the target phrase coverage would be set to 40%.

Next, at step 205, the current phrase coverage for the training set is compared to the target phrase coverage to determine whether the target phrase coverage has been achieved. If the answer is yes, processing stops and the training set is complete. If not, then a counter "I" is initialized to 1, and a variable ("Max_Benefit") is set to 0. See step 210. While the counter I is less than or equal to the number of possible responses (step 215), a series of steps (steps 220, 235, 240 and 245, described below) are executed in order to calculate the benefit achieved from adding a token for the I-th response to the training set. At step 220, a benefit achieved by adding a token for the I-th response to the training set is calculated based on an expected phrase coverage for adding a token for the I-th response (input 225) and a probability of occurrence for the I-th response (input 230). If the benefit is greater than the maximum benefit achieved so far by any response, then variables tracking the maximum benefit and the response corresponding to the maximum benefit are reset (steps 235 and 240).

Each time through the loop, the I counter will be incremented (at step 245), so that the next time through the loop, the benefit calculation will be performed for the next higher response in the set of possible responses. If it is determined at the beginning of any loop (more precisely, at step 215) that counter I is no longer less than or equal to the number of responses in the set of possible responses, then a token-response pairing having the current Max_Benefit response will be added to the training set (step 250). Next, at step 255, the current phrase coverage is incremented by the value of the Max_Benefit and processing returns to step 205, where the new current phrase coverage is compared to the target phrase coverage, once again to determine whether it is appropriate to stop processing token-response pairings for the training set or execute the loop again in order to determine whether or not the next response has a greater benefit.

As shown in FIG. 2, the benefit is calculated at step 220 based on the expected phrase coverage from adding a token for the I-th response (input 225 in FIG. 2) and the probability of occurrence for the I-th response (shown as input 230 in FIG. 2). FIG. 3 depicts a flow diagram illustrating the steps performed in an embodiment of the present invention in order to compute the probability of occurrence for the I-th response. As shown at step 320, the probability of occurrence is typically calculated based on call statistics from a prior or current deployment, which may or may not have been automated or partially automated. Assuming, if call statistics from a prior deployment are used for these purposes, that response I will occur in the current deployment about as many times as it occurred in the prior deployment, the prior deployment occurrences of each I are counted (steps 305), along with the total number of occurrences of all I's in the set of possible responses (step 310). Finally, the count of occurrences for each response I is divided by the total occurrences of all responses (step 315). At this point, the distribution of probabilities is known and therefore can be used as inputs to the process flow illustrated in the diagram presented in FIG. 2.

FIGS. 4A and 4B depict a flow diagram illustrating the steps performed in order to compute the expected phrase coverage distribution according to an embodiment of the present invention. As shown in FIG. 4A, the first step, step 405, is to transcribe a set of audio recordings comprising the token-response pairings of another directory assistance deployment. Typically, although not necessarily, the tokens are obtained from a prior deployment, transcribed and stored in a transcription database. The tokens may be actual, previously recorded calls serviced by human directory assistance operators. Because these calls are calls that were already serviced, the transcription database contains not only what the callers said, but the telephone numbers that were given out by the human directory assistance operators. Next, at step 410, a counter I is initialized to 1, and two variables, Max_Responses (representing the total number of responses in a plurality of possible responses) and Max_Tokens_Per_Response (representing the maximum possible number of tokens for any response), are initialized. The plurality of possible responses may correspond to the set of all possible responses, or some subset of the same. As long as counter I remains less than or equal to Max_Responses (the comparison is made at step 415), a series of steps (steps 420, 425, 430, 432, 435 and 440 in FIG. 4A) will be executed, as described below, in order to generate a phrase coverage for the I-th response using k training tokens. This is done for all I as I ranges from 1 to Max_Responses. Then, the phrase coverage for each Response I (as I ranges from 1 to Max_Responses) is computed for each k between 1 and Max_Tokens_Per_Response (shown as steps 450, 455, 460 and 465 in FIG. 4B and described below). The result of all of these steps will be an array (designated ph.cov( ) in FIGS. 4A and 4B, that is populated with the phrase coverage distribution for all of the responses in the pre-determined set of responses.

Referring again to FIG. 4A, at step 420, a predetermined number (the number is represented by the variable M in FIG. 4A) of transcribed token-response pairings for the I-th response are randomly selected to form a random set of token response pairings, all having I as the response in the token-response duo. The random set is then divided into a test subset and a training subset and a training token counter k is initialized to zero for this response (step 425). Next, in a step 430, a comparison is made to determine whether k is less than Max_Tokens_Per_Response. If the answer is yes, k is incremented by 1 (step 432) and the system determines how many tokens in the test subset are "adequately predicted" by the tokens contained in the training subset (step 435). As stated above, in some embodiments, the number of tokens adequately predicted equals the number of phrases in the training subset that exactly match a phrase in the test subset. In other embodiments, the number of tokens adequately predicted equals the number of phrases in the training subset that match a phrase in the test subset, based on a perplexity threshold of a statistical n-gram language model. The phrase coverage for the I-th response is then set to the number of tokens adequately predicted divided by the number of tokens in the test subset (step 440). Preferably, although not necessarily, this value is recorded in an array or other data structure in computer memory, configured to hold and/or provide the phrase coverage distribution.

At this point, processing returns to step 430 again, where the values of k and Max_Tokens_Per_Response are compared to see if k is still less than Max_Tokens_Per_Response. If not, steps 432, 435 and 440 are executed again, and will continue to be executed for all k between 1 and Max_Tokens_Per_Response. However, when k is incremented enough times so that it is no longer less than Max_Tokens_Per_Response, then the counter I is incremented by one (step 445), and processing returns to step 415, where I is compared, once again, with the value of Max_Responses to determine whether all of the responses in the plurality of possible responses have been processed. If I is still less than or equal to Max_Responses, then steps 420, 425, 430, 432, 435, 440 and 445 are executed again for the next response (the incremented value of I) in the plurality of possible responses. However, if I is not less than or equal to Max_Responses (in other words, if I is greater than Max_token_responses), then control passes to step 450 (shown in FIG. 4B) by way of flowchart connector FC4.

The flowchart shown FIG. 4B illustrates by example the steps that may be taken in an embodiment of the present invention in order to find the expectedphrase coverage as a function of k (the number of tokens in the training set for the I-th response) for all I, as I ranges from 1 to Max_Responses. As shown in FIG. 4B, the first step in this process is to re-initialize the variable k zero (step 450). The value of k is then compared to the value of Max_Tokens_Per_Response (step 455) and, if k is less than Max_Tokens_Per_Response, k will be incremented. Next, in step 465, k will be used as an index to reference the appropriate element of an array, designated exp.ph.cov, configured to store the expected phrase coverage distribution values called for by input 225 of FIG. 2. Thus, as shown in step 465, the expected phrase coverage distrubution for ("exp.ph.cov(k)") is found by summing the phrase coverages for the I-th response over all I (as I ranges from 1 to Max_Responses), and dividing the result by the value of Max_Responses. This averaging is necessary since the responses in the earlier deployment are very likely to be different than the responses to be automated for the current deployment.

Control then passes back to step 455, where the value of k is again checked against the value of Max_Tokens_Per_Response. For as long as k remains less than Max_Tokens_Per_Response, steps 460 and 465 will be executed repeatedly, thereby populating the expected phrase coverage distribution array. When k becomes equal to or greater than Max_Tokens_Per_Response, processing stops because the expected phrase coverage distribution is now known and can be used by other modules or processors in the system.

FIG. 5 depicts a flow diagram illustrating the steps performed in order to compute the benefit associated with adding to the training set another token-response pairing for the I-th response in an embodiment of the present invention. First, in step 505, a counter N is set equal to the number of tokens in the training set corresponding to the I-th response. Next, at step 510, an incremental phrase coverage is calculated by subtracting the phrase coverage for the I-th response from the phrase coverage for the I-th response if there were one more token-response pairings (i.e., N+1 token-response pairings) for the I-th response in the training set. The benefit is then computed by multiplying the probability of occurrence for the I-th response with the incremental phrase coverage for the I-th response (step 515).

Figure 6:
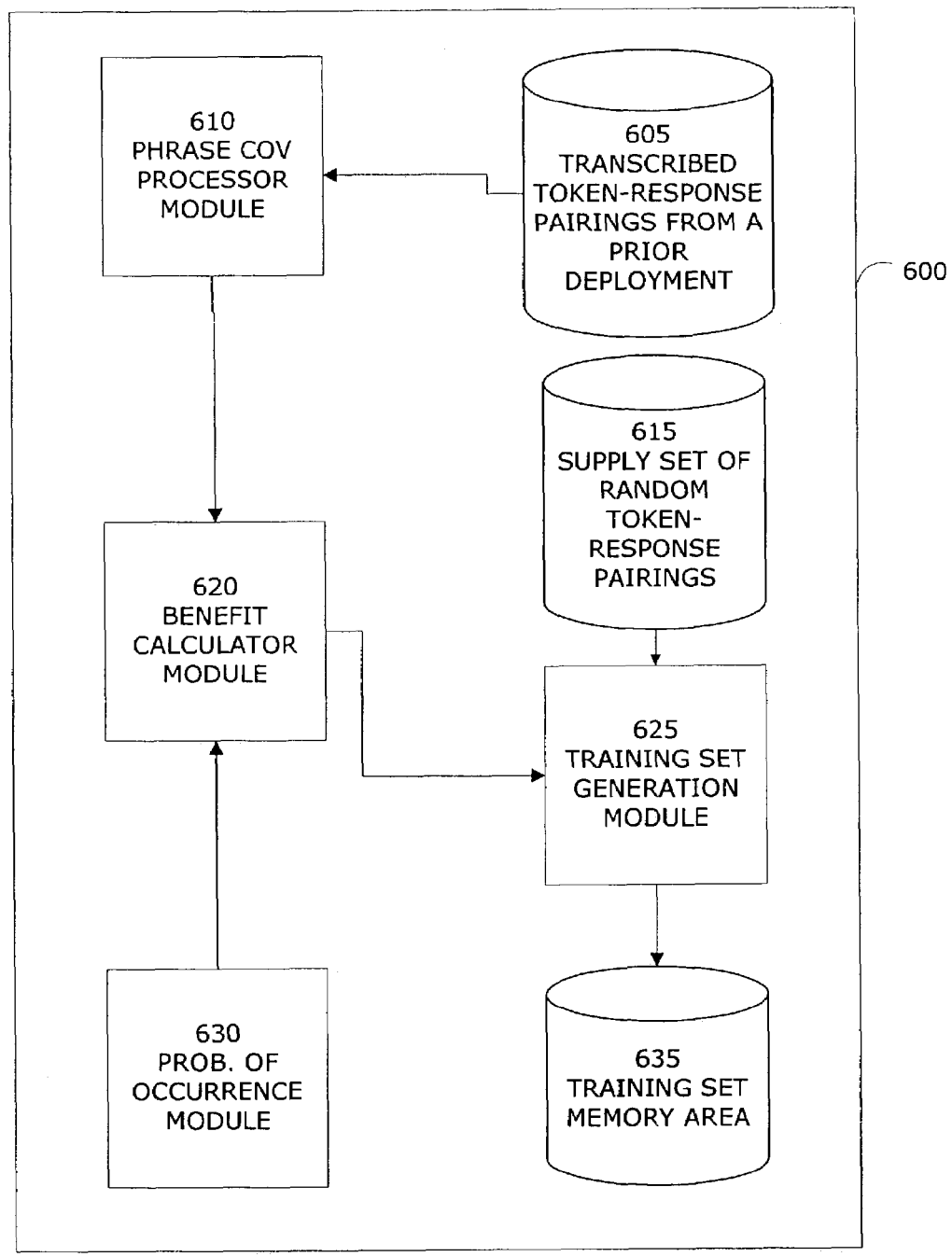
FIG. 6 depicts a block diagram illustrating an arrangement of some of the physical components in an embodiment of the invention.

FIG. 6 shows a block diagram of a computer system configured to operate in accordance with an embodiment of the present invention. As shown in FIG. 6, Computer System 600 comprises a Phrase Cov Processor Module 610, a Benefit Calculator Module 620, a Prob. Of Occurrence Module 630, and a Training Set Generation Module 625. In a preferred embodiment of the invention, and as shown in FIG. 6, Phrase Cov Processor Module 610 is coupled to a database (designated with reference number 605 in FIG. 6) containing a set of transcribed token-response pairings from a prior deployment. The transcribed token-response pairings in the database are used by Phrase Cov Processor Module 610 to generate a phrase coverage distribution for a plurality of possible responses, as described above with reference to FIG. 4, which distribution is then provided as an input to Benefit Calculator Module 620. Benefit Calculator Module 620 uses the phrase coverage distribution, along with the probability of occurrence for each response, as provided by Prob. of Occurrence Module 630, to calculate a benefit associated with adding another token-response pairing for the I-th response to the training set. This benefit calculation is then provided to Training Set Generation Module 625, which, in the preferred embodiment, actually builds the training set of token-response pairings. As shown in FIG. 6, Training Set Generation Module 625 may be coupled to a supply set comprising a random set of token-response pairings (designated 615 in FIG. 6) from which it retrieves token-response pairings in order to build the training set. Finally, as shown in FIG. 6, Training Set Generation Module 625 may be configured to store the token-response pairings added to the training set in a memory area (designated 635 in FIG. 6) specifically configured to hold the new training set. Notably, the exemplary components shown in FIG. 6 may be implemented using hardware, software, or any combination thereof, and may also be combined such that two or more of the described functions may be performed by one component.

To further illustrate how the invention, as embodied in the examples shown in FIGS. 2-6, might operate in practice, assume that, for frequent response I, we have so far accumulated $k_i$ token-responses in the training set. Assume further that we have accumulated a total of P token-response pairings in the training set so far. In other words, I is the value of the response in $k_i$ out of the P token-response pairings already in the training set. Now, assume further that a processor configured to perform the functions of the Training Set Generation Module in FIG. 6 is looping through the flow diagram illustrated in FIG. 2 to collect the (P+1)-th token-response pairing. As the processor steps through each response to compute the benefit, the benefit for collecting another token-response pairings for frequent response I will be calculated as follows.

As stated above, frequent response I already has $k_i$ tokens in the training set associated with it so far. The current phrase coverage associated with just the tokens for response I is ph.cov($k_i$). Further, if a (P+1)-th token corresponding to response I is collected (which would increase the number of tokens in the training set for the I-th response from $k_i$ to $k_i+1$), the current phrase coverage associated with just the tokens for response I would increase to ph.cov($k_i+1$). Accordingly, the increment in current phrase coverage for the tokens associated with response I equals [ph.cov($k_i+1$)−ph.cov($k_i$)]. This incremental phrase coverage is then multiplied by the probability of occurrence of response I, say $p(t_i)$ to get $p(t_i)*$[ph.cov($k_i+1$)−ph.cov($k_i$)] as the benefit associated with collecting an additional token for response I. The same exercise is performed for every response in the plurality of possible responses. Each time through the loop, the number of training tokens would most likely (although not necessarily) be different for each different frequent response (e.g., for responses W, Y and Z). Similarly, the probabilities of occurrence for each response W, Y and Z would (most likely) be different than the probability of occurrence for response I (those probabilities being equal to $p(t_w)$, $p(t_y)$ and $p(t_z)$, instead of $p(t_i)$).

As described in detail above, an important calculation at the heart of the described embodiment of the present invention is the product of the probability of occurrence and the phrase coverage for the I-th FRN (represented by $p(t_i)$ *ph.cov($k_i$)). The embodiment described above, however, contains an implicit assumption that the retrieval efficiencies for all the responses (FRNs) are the same. The retrieval efficiency $r(t_i)$ for the I-th FRN is the percentage of correctly recognized listings that end up being actually automated by the system, such as through a retrieval action table. It has been observed, however, that retrieval mechanisms typically used in automations such as the one described here do not always exhibit the same rate of success for all FRNs in a set of FRNs.

Accordingly, in a preferred embodiment, the retrieval efficiency, $r(t_i)$, for each FRN is taken into account by incorporating a retrieval efficiency value into the benefit calculation. That is to say, the benefit associated with the I-th response is multiplied by the retrieval efficiency $r(t_i)$ for the I-th response. Similarly, it is also possible that certain types of FRNs (or responses) are easier to automate than others. As stated above, for example, FRNs such as department stores tend to have many caption sets (different numbers associated with each listing), as opposed to straight-line listings (one number per listing). Since straight line listings are easier to automate than caption sets, this known information may be included in the benefit calculation as well in the form of a "probabilistic cost" multiplier. Thus, the step of calculating the benefit may also include multiplying the product of the incremental phrase coverage and the probability of occurrence for each response by the probabilistic cost for each response in the plurality of possible responses.

Figure 7:
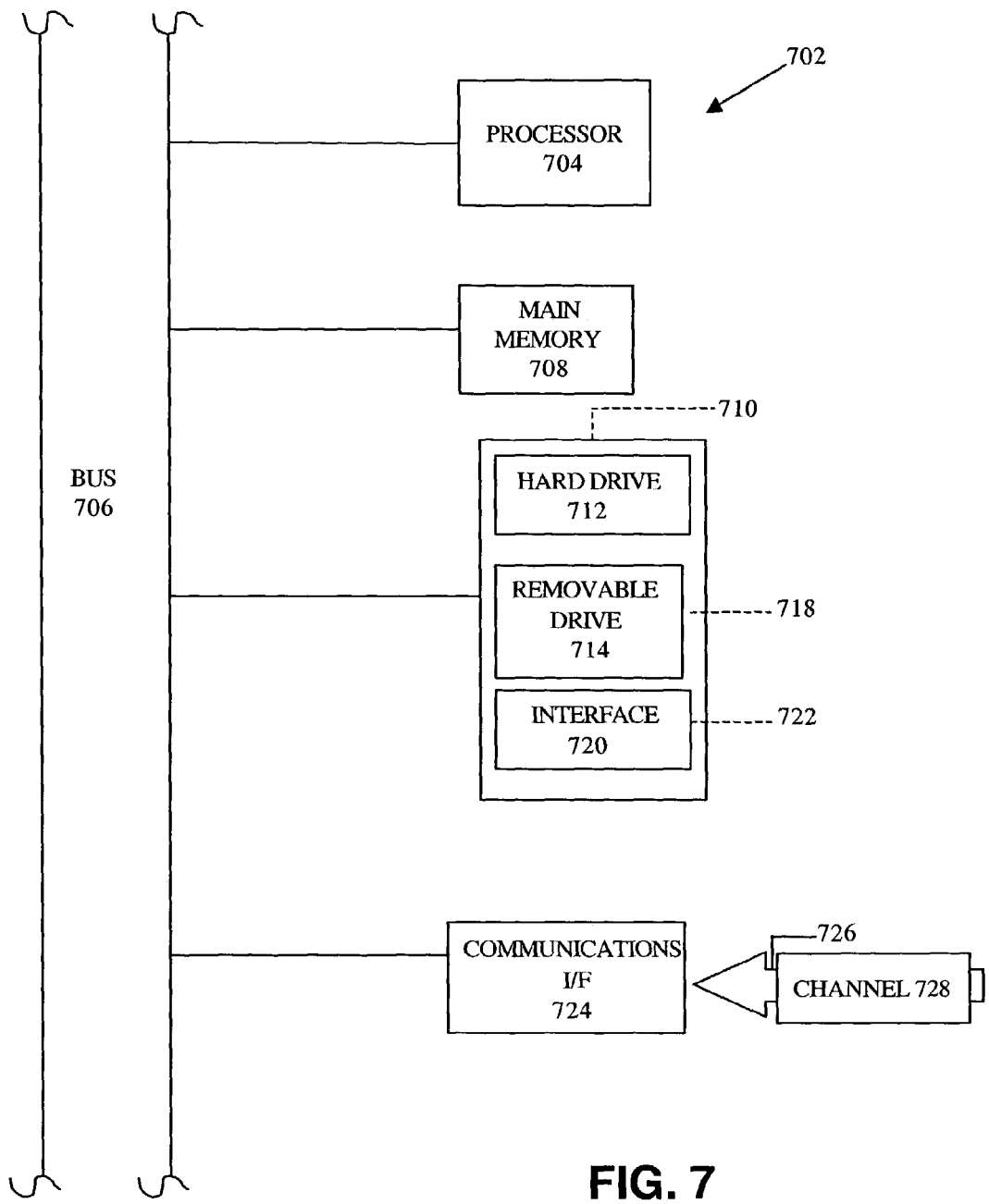
FIG. 7 is a block diagram of a computer system that may be used to implement an embodiment of the present invention.

FIG. 7 is a block diagram of a computer system as may be used to implement an embodiment of the invention. The computer system 702 includes one or more processors, such as a processor 704. The processor 704 is connected to a communication bus 706. Various software embodiments are described in terms of this exemplary computer system. After reading this description, it will become apparent to a person skilled in the relevant art how to implement the invention using other computer systems and/or computer architectures.

The computer system 702 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. The removable storage unit 718, represents a floppy disk, magnetic tape, optical disk, etc. which is read by and written to by the removable storage drive 714. As will be appreciated, the removable storage unit 718 includes a computer usable storage medium having stored therein computer software and/or data.

In alternative embodiments, the secondary memory 710 may include other similar means for allowing computer programs or other instructions to be loaded into the computer system 702. Such means can include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interface 720 which allow software and data to be transferred from the removable storage unit 722 to the computer system 702.

The computer system 702 can also include a communications interface 724. The communications interface 724 allows software and data to be transferred between the computer system 702 and external devices. Examples of the communications interface 724 can include a modem, a network interface (such as an Ethernet card), a communications port, a PCMCIA slot and card, etc. Software and data transferred via the communications interface 724 are in the form of signals 726 that can be electronic; electromagnetic, optical or other signals capable of being received by the communications interface 724. Signals 726 are provided to communications interface via a channel 728, which can be implemented using wire or cable, fiber optics, a phone line, a cellular phone link, an RF link and other communications channels.

In this document, the term "computer-readable storage medium" is used to generally refer to media such as the removable storage device 718, a hard disk installed in hard disk drive 712, and signals 726. These media are means for providing software and operating instructions to the computer system 702.

Computer programs (also called computer control logic) are stored in the main memory 708 and/or the secondary memory 710. Computer programs can also be received via the communications interface 724. Such computer programs, when executed, enable the computer system 702 to perform the features of the present invention as discussed herein. In particular, the computer programs, when executed, enable the processor 704 to perform the features of the present invention. Accordingly, such computer programs represent controllers of the computer system 702.

In an embodiment where the invention is implemented using software, the software may be stored in a computer-readable storage medium and loaded into the computer system 702 using the removable storage drive 714, the hard drive 712 or the communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

System Architecture

As stated above, in a preferred embodiment, the present invention allows an inexact match between the tokens in a training set and a test set. To further illustrate the features, operation and advantages of the present invention, particularly with respect to the concept of allowing inexact matches, an example of a system architecture for a directory assistance automation (DAA) system, where the present invention may be beneficially employed, will now be discussed in detail. In this example, the DAA system first prompts callers to state a locality and then a listing, and inexactness is allowed both in terms of the word-structure of the listing utterance, as well as the validity of the listing and locality pair.

To allow for the inexact matches, the directory assistance automation (DAA) solution may be broken down into three independent, sequential stages of operations
 1. Accurately recognizing the listing and locality utterances
 2. Retrieving the most appropriate FRN given the recognized listing and locality
 3. Making the automation decision: release the top-choice retrieved FRN, or transfer call to operator.

The block diagram in FIG. 8 graphically illustrates the sequence of operations in a system configured to operate in accordance with the present invention. Rectangular blocks are operations to be performed and those with curved corners designate statistical models that need to be trained, and which can be trained in accordance with the principles of the present invention. In particular, and as shown in FIG. 8, Locality Recognizer 835 performs the function of receiving and recognizing the caller's locality utterance and passes the results to Retrieval 815. When the caller provides a listing utterance, Continuous Density Acoustic Models 801, N-gram Language Model 811 and Listing Recognizer 810 together perform the function of recognizing the listing. Statistical FRN Database 821 and Retrieval 815 perform the retrieval operation, while Confidence Model 831 and Confidence Measure 820 provides a confidence-like score on the top-ranked FRN from the ranked FRN list produced by the retrieval engine. The final stage of the automation decision is called the rejection stage, and it comprises Rejection Model 841 and Rejection Decision 825. The decision of whether to release a recorded FRN or transfer the call to an operator is made by comparing the score with a specified threshold. If the score is above the specified threshold, the top-choice FRN is released to the caller. Otherwise, the call is transferred to the operator.

In the example depicted in FIG. 8, it is very important to ensure that the "automate or not-automate" decision strategy used in the last stage is designed to minimize the number of false accepts (FA). A FA occurs when the top-choice FRN is not the correct answer to the caller's query but is still automatically released to the caller. The usual metric of the quality of service (QOS) for a DAA is the ratio of the number of correct accepts (CA) to the number of FA's.

Speech Recognition

The directory assistance query for the system depicted in FIG. 8 consists of two utterances, a locality utterance and a listing utterance. Listing utterances tend to be more complicated and exhibit more variations than locality utterances. In addition to various forms of the listing name itself, users commonly use one of a large number of prefix/suffix combinations. Occasionally the listing utterance also contains fragments of a conversation that the user may be engaged in with another human during the duration of the directory assistance request. In order to effectively model the variations in listing utterances, a tri-gram language model with an appropriate back-off may be used. Examples of back off techniques suitable for these purposes are described in P. Placeway, R. Schwartz, P. Fung, and L. Nguyen, *The Estimation of Powerful Language Models from Small and Large Corpora*, IEEE ICASSP, Minneapolis, Minn., pp. 33-36, April 1993, which is incorporated herein by reference in its entirety.

Preferably, the language model is trained on a statistically optimized training set of token-response pairings generated in accordance with the present invention. The language model training data also may be augmented with information from a directory assistance database, which is particularly helpful for FRNs that have sparse training. For the directory assistance application described in this example, listing utterances may be recognized using a Byblos decoder configured with PTM models in the forward pass and SCTM models in the backwards pass. These models are described in L. Nguyen, T. Anastasakos, F. Kubala, C. LaPre, J. Makhoul, R. Schwartz, Y. Yuan, G. Zavaliagkos, Y. Zhao, *The 1994 BBN/BYBLOS Speech Recognition System*, DARPA Spoken Language Systems Technology Workshop, Austin, Tex., January 1995, pp. 77-81, and L. Nguyen and R. Schwartz, *Efficient 2-pass N-best Decoder*, Eurospeech, Rhodes, Greece, Vol. 1, pp. 167-170, September 1997, both of which are incorporated herein by reference in their entirety. Locality recognition, on the other hand, may be performed with a much simpler FSG containing a reasonably sized grammar for the allowed localities.

FRN Retrieval

Rather than force an exact match between the query and the training data, the probability of a particular inexact match being an acceptable one is estimated and used to make the automation decision. For the purpose of discussing the retrieval strategy we consider the retrieval query to be made up of the recognized listing and locality. We allow the user to query for a listing using a new listing phrase that was not seen in training. Also, by means of a probabilistic locality expansion map, we allow for a new locality-listing pair that was not seen in the training data for a particular FRN.

Suppose, for example, we have a directory assistance database entry for ACME and four examples of spoken queries for ACME as shown below:

DA Database Entry:

ACME SERVICE COMPANY :: XCITY :: 1010 Y AVENUE :: 555-555-5555
User request examples:

ACME COMPANY I GUESS
ACME STORE
ACME
ACME XMALL

Further assume that the locality associated with this query is different from the localities seen in training. The following utterance is an example of a real customer asking for the same ACME listing
Locality Query: XCITY, YSTATE
Listing Query: AH ACME ACME STORE
This example contains words that have all been seen in training data for the same listing but in a different order than in any of the training examples. We wish to retrieve the FRN that is most likely the correct response given the data, i.e., FRN*

$$FRN^* = \arg\max_{FRN_K} P(FRN_k \mid Q)$$

Applying Bayes' rule, $$P(FRN_k \mid Q) = \frac{P(Q \mid FRN_k) \cdot P(FRN_k)}{P(Q)}$$

$P(Q|FRN_k)$ is the probability of the query being posed under the hypothesis that $FRN_k$ is being requested, $P(FRN_k)$ is the prior probability of $FRN_k$ being requested, and $P(Q)$ is the probability of the query. Since, $P(Q)$ is the same for all FRNs, we only need to compute $P(Q|FRN_k)$ and $P(FRN_k)$.

$P(Q|FRN_k)$ is computed as the product of $P(List|FRN_k)$, the probability of the listing query given the $FRN_k$ and $P(Loc|FRN_k)$, the probability of the locality query given the $FRN_k$ under the assumption that the recognized listing and recognized locality are conditionally independent of each other (given $FRN_k$). In a preferred embodiment, $P(List|FRN_k)$ may be computed using an HMM-based information retrieval system, such as the one described in D. Miller, T. Leek, and R. Schwartz, "A Hidden Markov Model Information Retrieval System," *ACM SIGIR*, Berkeley, Calif., pp. 214-221, August 1999, which is also incorporated herein by reference in its entirety. This information retrieval system uses a two-state ergodic HMM topology. One state corresponds to the query word being generated by a particular FRN and the other state corresponds to the query word being a non-FRN phrase (NF). The formula for computing $P(List|FRN_k)$ is, $$P(List \mid FRN_k) = \prod_{q \in List} (a_0 P(q \mid NF) + a_1 P(q \mid FRN_k))$$

where $a_0$ and $a_1$ are the transition probabilities. The two-state model is simplified by tying the transition probabilities between states across all FRNs and the weights $a_0$ and $a_1$ are estimated from the training data consisting of transcribed queries for each FRN. Again, the training data are augmented with database entries and the top N FRNs along with the associated values of $P(List|FRN_k)$ are returned (a typical value for N is 100).

$P(Loc|FRN_k)$ is estimated from training data. The locality expansion map is implemented as part of the computation for $P(Loc|FRN_k)$ by allowing an appropriate back-off mechanism. The probability of the composite query given the $FRN_k$ is then computed as follows $$P(Q|FRN_k) = P_B(Loc|FRN_k)^{w1} \cdot P(List|FRN_k)^{w2}$$

Next $P(FRN_k)$ is computed as a product of the prior probability of $FRN_k$ and the probability of the query given the $FRN_k$ as shown below $$P(FRN_k|Q) = P(FRN_k)^{w3} \cdot P(Q|FRN_k)$$

Finally, the FRN set is ranked in order of decreasing $P(FRN_k|Q)$ with the top ranked FRN being the one most likely to be the correct response to the user query.

Rejection

After the retrieval engine returns the top-choice FRN, the rejection component decides whether to release the top-choice FRN to the caller or route the caller to a human operator so that the query can be answered manually. To deliver a high quality of service, the ratio of correct automations to false automations should be as high as possible. With this principle in mind, the operation of the rejection module comprises essentially a two-class classification task. In a preferred embodiment, this classification task may be accomplished with the Generalized Linear Model (GLM) classifier described in T. Hastie and R. Tibshirani, "Generalized Additive Models," Chapman and Hall, London, 1990 (the entirety of which is incorporated herein by this reference), which computes a confidence-like score on a set of features derived from the query.

Two important features used in the rejection step are the required and allowable word sets. As the name suggests, the required word set for a particular FRN is a set of word tuples at least one of which must be present in the recognized listing for the query to be associated to that FRN. On the other hand, the allowable word set for a particular FRN is a list of words that are allowable in the recognized listing if the query is to be associated to that FRN. Together, the required and allowable words provide a powerful filtering technique that weed out a large fraction of the false automations. Other features used in the rejection stage are word confidences, n-best frequency, and various other scores from the recognizer and the retrieval engine. The top-choice FRN is automatically released to the caller only if the rejection score is above a pre-set threshold. Otherwise the call is routed to a human operator. The rejection component cuts down the FA's while keeping the number of CA's constant.

The above-described preferred embodiments are intended to illustrate the principles of the invention, but not to limit its scope. Various other embodiments may occur to those skilled in the art upon reading the present disclosure or practicing the claimed invention. Such variations, modifications and equivalents are intended to come within the scope of the invention and the appended claims.

What is claimed is:

1. A method for building a training set of token-response pairings for an automated speech-recognition-based system, comprising the steps of:
   (a) for each response in a plurality of possible responses, calculating, based on an expected phrase coverage for said each response and a probability of occurrence for said each response, a benefit that would be achieved by adding to the training set a token-response pairing for said each response;
(b) identifying a maximum benefit response, said maximum benefit response being equal to the response from the plurality of possible responses having the maximum benefit;
(c) adding to the training set, a token-response pairing containing the maximum benefit response;
(d) incrementing a current phrase coverage for the training set by an amount equal to the product of the expected phrase coverage for the number of token-response pairings in the training set that contain the maximum benefit response, and the probability of occurrence of the maximum benefit response; and
(e) repeating steps (a) to (d) until the current phrase coverage is greater than or equal to a target phrase coverage.

2. The method of claim 1, wherein the token-response pairing containing the maximum benefit response is selected from a supply set of randomly-selected token-response pairings.

3. The method of claim 1, wherein the probability of occurrence for each response in the plurality of possible responses is determined by:
(f) providing a collection of responses supplied in response to a predetermined number of user requests; and
(g) for each response in the plurality of possible responses,
  i) counting the number of times said each response occurs in the collection to generate a frequency of occurrence for said each response, and
  ii) dividing the frequency of occurrence by the predetermined number of user requests.

4. The method of claim 1, wherein the expected phrase coverage for said each response is determined by:
(f) providing a collection of token-response pairings supplied in response to a predetermined number of user requests; and
(g) for said each response in the plurality of possible responses,
  i) randomly selecting from the collection a predetermined number of token-response pairings containing said each response to form a random set of token-response pairings,
  ii) dividing the random set into a training subset and a test subset,
  iii) determining a number of tokens in the test subset that are adequately predicted by the training subset, and
  iv) dividing the number of adequately predicted tokens by a number of tokens in the test subset.

5. The method of claim 4, wherein the number of tokens adequately predicted equals the number of phrases in the training subset that exactly match a phrase in the test subset.

6. The method of claim 4, wherein the number of tokens adequately predicted equals the number of phrases in the training subset that match a phrase in the test subset, based on a perplexity threshold of a statistical n-gram language model.

7. The method of claim 6, wherein the statistical n-gram language model is trained against another training set of token-response pairings.

8. The method of claim 6, wherein the statistical n-gram language model is measured against a test set of token-response pairings.

9. The method of claim 1, wherein the current phrase coverage is equal to zero prior to carrying out step (d) for the first time.

10. The method of claim 1, wherein the step of calculating the benefit comprises:
(f) computing an incremental phrase coverage, said incremental phrase coverage comprising a difference between the expected phrase coverage for said each response if the training set held one additional token corresponding to said each response and the current phrase coverage for said each response; and
(g) multiplying the incremental phrase coverage by the probability of occurrence of said each response in the plurality of possible responses.

11. The method of claim 10, wherein the step of calculating the benefit further comprises multiplying the product of the incremental phrase coverage and the probability of occurrence for said each response by a retrieval efficiency for said each response in the plurality of possible responses.

12. The method of claim 10, wherein the step of calculating the benefit is further carried out by multiplying the product of the incremental phrase coverage and the probability of occurrence for said each response by a probabilistic cost for said each response in the plurality of possible responses.

13. The method of claim 1, wherein each token in the training set comprises a transcribed directory assistance request.

14. The method of claim 1, wherein each response in the training set comprises a transcribed response to a directory assistance request.

15. The method of claim 1, further comprising providing the training set for training an automated speech-recognition-based system.

16. The method of claim 15, wherein providing the training set comprises storing the training set.

17. The method of claim 15, wherein providing the training set comprises loading the training set onto a computer system for training the automated speech-recognition-based system.

18. The method of claim 1, further comprising providing an automated response to a request received by an automated speech-recognition-based system, wherein the response is selected based on a token-response pair in the training set.

19. A system for building a training set of token-response pairings for an automated speech-recognition-based system, comprising:
means for calculating, for each response in a plurality of possible responses, a benefit that would be achieved by adding to the training set a token-response pairing for said each response;
means for identifying a maximum benefit response, said maximum benefit response being equal to the response from the plurality of possible responses having the maximum benefit;
means for adding to the training set, a token-response pairing containing the maximum benefit response; and
means for incrementing a current phrase coverage for the training set by an amount equal to the product of the expected phrase coverage for the number of token-response pairings in the training set that contain the maximum benefit response, and the probability of occurrence of the maximum benefit response.

20. The system of claim 19, further comprising means for selecting the maximum benefit response from a supply set of randomly-selected token-response pairings.

21. The system of claim 19, wherein the calculating means is responsive to a means for computing the probability of occurrence for said each response and a means for computing the expected phrase coverage for said each response.

22. The system of claim 19, wherein the means for computing the probability of occurrence for said each response comprises:
   a collection of responses supplied in response to a predetermined number of user requests;
   means for counting the number of times said each response occurs in the collection to generate a frequency of occurrence for said each response; and
   means for dividing the frequency of occurrence for said each response by the predetermined number of user requests.

23. The system of claim 19, wherein the means for computing the expected phrase coverage for said each response comprises:
   a collection of token-response pairings supplied in response to a predetermined number of user requests;
   means for randomly selecting from the collection a predetermined number of token-response pairings containing said each response to form a random set of token-response pairings;
   means for dividing the random set into a training subset and a test subset;
   means for determining a number of tokens in the test subset that are adequately predicted by the training subset; and
   means for dividing the number of adequately predicted tokens by a number of tokens in the test subset.

24. The system of claim 23, wherein the number of tokens adequately predicted equals the number of phrases in the training subset that exactly match a phrase in the test subset.

25. The system of claim 23, wherein the number of tokens adequately predicted equals the number of phrases in the training subset that match a phrase in the test subset, based on a perplexity threshold of a statistical n-gram language model.

26. The system of claim 25, wherein the statistical n-gram language model is trained against another training set of token-response pairings.

27. The system of claim 25, wherein the statistical n-gram language model is measured against a test set of token-response pairings.

28. The system of claim 19, wherein the means for calculating the benefit comprises:
   means for computing an incremental phrase coverage, said incremental phrase coverage comprising the difference between the expected phrase coverage for said each response if the training set held one additional token
   corresponding to said each response and the current phrase coverage for said each response; and
   means for multiplying the incremental phrase coverage by the probability of occurrence of said each response in the plurality of possible responses.

29. The system of claim 28, wherein the means for calculating the benefit further comprises means for multiplying the product of the incremental phrase coverage and the probability of occurrence for said each response by a retrieval efficiency for said each response in the plurality of possible responses.

30. The system of claim 28, wherein the means for calculating the benefit further comprises means for multiplying the product of the incremental phrase coverage and the probability of occurrence for said each response by a probabilistic cost for said each response in the plurality of possible responses.

31. The system of claim 19, further comprising means for providing an training set for training an automated speech-recognition-based system.

32. The system of claim 31, wherein the means for providing the training set comprises means for storing the training set.

33. The system of claim 31, wherein the means for providing the training set comprises means for loading the training set onto a computer system for training the automated speech-recognition-based system.

34. The system of claim 19, further comprising means for providing an automated response to a request received by an automated speech-recognition-based system, wherein the response is selected based on a token-response pair in the training set.

35. A system for generating a training set of token-response pairings for an automated speech-recognition-based system, comprising:
   a phrase coverage processor module configured to calculate a phrase coverage associated with a response out of a plurality of possible responses;
   a probability of occurrence module configured to compute, responsive to a prior collection of token-response pairings, a statistical probability that said response will occur in a predetermined number of responses;
   a benefit processor configured to determine, responsive to the phrase coverage processor module and the probability of occurrence module,
      a benefit that would be achieved by adding a token-response pairing to the training set, and
      a maximum benefit response, said maximum benefit response being equal to the response from the plurality of responses having maximum benefit; and
   a training set generation module configured to add to the training set a token response pairing from the supply set containing the maximum benefit response.

36. The system of claim 35, wherein the training set generation module selects the token-response pairing containing the maximum benefit from a supply set of randomly-selected token-response pairings.

37. The system of claim 35, wherein the benefit processor comprises:
   means for computing an incremental phrase coverage, said incremental phrase coverage comprising the difference between the expected phrase coverage for said each response if the training set held one additional token corresponding to said each response and the current phrase coverage for said each response; and
   means for multiplying the incremental phrase coverage by the probability of occurrence of said each response in the plurality of possible responses.

38. The system of claim 37, wherein the means for calculating the benefit further comprises means for multiplying the product of the incremental phrase coverage and the probability of occurrence for said each response by a retrieval efficiency for said each response in the plurality of possible responses.

39. The system of claim 37, wherein the means for calculating the benefit further comprises means for multiplying the product of the incremental phrase coverage and the probability of occurrence for said each response by a probabilistic cost for said each response in the plurality of possible responses.

40. The system of claim 35, further comprising a training set memory module that stores the training set for training an automated speech-recognition-based system.

* * * * *